(12) United States Patent
Alliot

(10) Patent No.: US 8,963,697 B2
(45) Date of Patent: Feb. 24, 2015

(54) DISPLAY DEVICE, IN PARTICULAR FOR A MOTOR VEHICLE

(76) Inventor: Patrick Alliot, Le Pecq (FR)

(*) Notice: Subject to any disclaimer, the term of this patent is extended or adjusted under 35 U.S.C. 154(b) by 348 days.

(21) Appl. No.: 13/509,261

(22) PCT Filed: Nov. 4, 2010

(86) PCT No.: PCT/EP2010/006708
§ 371 (c)(1),
(2), (4) Date: Jul. 10, 2012

(87) PCT Pub. No.: WO2011/057736
PCT Pub. Date: May 19, 2011

(65) Prior Publication Data
US 2012/0268257 A1    Oct. 25, 2012

(30) Foreign Application Priority Data

Nov. 11, 2009   (DE) .......................... 10 2009 052 850
Sep. 17, 2010   (FR) ...................................... 10 03698

(51) Int. Cl.
B60Q 1/00       (2006.01)
B60K 37/00      (2006.01)
G02B 27/01      (2006.01)

(52) U.S. Cl.
CPC ............ B60K 37/00 (2013.01); G02B 27/0101 (2013.01); B60K 2350/901 (2013.01); G02B 2027/0159 (2013.01); G02B 2027/0165 (2013.01); B60K 2350/2052 (2013.01)
USPC .......................................... 340/425.5; 701/1

(58) Field of Classification Search
CPC ....... B60R 2300/205; B60R 1/00; B60Q 1/00
USPC ...................................................... 340/425.5
See application file for complete search history.

(56) References Cited

U.S. PATENT DOCUMENTS

| 5,204,666 | A  | * | 4/1993  | Aoki et al. .................. 345/9 |
| 7,446,650 | B2 | * | 11/2008 | Scholfield et al. .......... 340/438 |
| 2002/0114147 | A1 |   | 8/2002 | Harter, Jr. |
| 2007/0013181 | A1 |   | 1/2007 | Heck |
| 2008/0158096 | A1 | * | 7/2008 | Breed .......................... 345/7 |
| 2009/0128307 | A1 | * | 5/2009 | Hentsch et al. ........... 340/425.5 |
| 2010/0066832 | A1 | * | 3/2010 | Nagahara et al. ............ 348/148 |

(Continued)

FOREIGN PATENT DOCUMENTS

DE   10 205 032 706 A1   1/2007
EP       0 194 196 A1    9/1986

(Continued)

OTHER PUBLICATIONS

Japanese Office Action dated Jan. 15, 2014.

(Continued)

*Primary Examiner* — Kerri McNally
(74) *Attorney, Agent, or Firm* — Fletcher Yoder, P.C.

(57) ABSTRACT

A display device, notably for an automobile vehicle, comprises a head down display module, and a head up display module. Means are provided for adjusting the position at least of the head up display module. The inclination of one or both of the head up and the head down display modules may also be adjusted. In such cases, the inclination of the modules may be the same or different. An adjustment axis may be provided for such adjustments, and this axis may be generally perpendicular to a normal viewing direction.

6 Claims, 1 Drawing Sheet

(56) References Cited

U.S. PATENT DOCUMENTS

Figure 1:
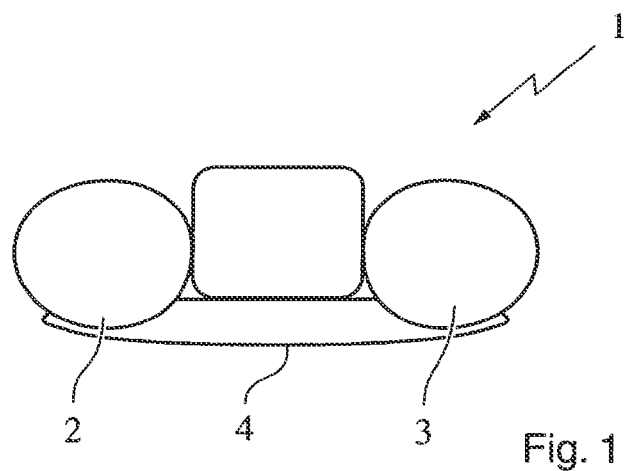

2010/0302018 A1* 12/2010 Tuzar et al. ............... 340/425.5
2010/0321170 A1* 12/2010 Cooper et al. ............. 340/425.5

FOREIGN PATENT DOCUMENTS

| JP | 61-268534 | 11/1986 |
| JP | 62-137236 | 6/1987 |
| JP | 2005521580 | 7/2005 |
| JP | 2005-225318 | 8/2005 |
| WO | 98 28649 A1 | 7/1998 |

OTHER PUBLICATIONS

International Search Report for application No. PCT/EP2010/006708 mailed Mar. 14, 2011.

* cited by examiner

DISPLAY DEVICE, IN PARTICULAR FOR A MOTOR VEHICLE

CROSS REFERENCE TO RELATED APPLICATIONS

This application claims priority from and the benefit of PCT Application No. PCT/EP2010/006708, filed on Nov. 4, 2010; German Patent No. DE 10 2009 052 850.4, filed on Nov. 11, 2009; and French Patent FR 10/03698, filed on Sep. 17, 2010; which are herein incorporated by reference.

BACKGROUND

The present invention relates to a display device, notably for an automobile vehicle.

Display devices of the head up type (HUD, head up display) are known, notably with the projection of an image toward a windshield as described in the document US 2002/0114147 A1.

Furthermore, a display device is known such that the position of the display device can be changed according to the position of the steering wheel of the vehicle such as is described in the document DE 10 2005 032 706 A1.

One drawback of such devices, according to the prior art, consists of the fact that the mechanisms allowing the variation of the position of the display device according to the position of the steering wheel are relatively complicated and, consequently, complex and costly.

SUMMARY

The aim of the present invention is notably to overcome the drawbacks of the prior art, and notably those mentioned hereinabove, and another aim is to provide a display device which allows an adjustment of a display device according to the needs of a user, notably of a vehicle driver.

According to the present invention, this aim is achieved by a display device, notably for an automobile vehicle, comprising a display module of the head down type, and
a display module of the head up type,
the display device comprising an adjustment means such that
the position at least of the display module of the head up type is adjustable.
the display device comprising an adjustment means such that
the position at least of the display module of the head up type is adjustable.

Such an embodiment of a display device means that it is advantageously possible to modify the position of the image seen by the user of the display device in a simple and efficient manner.

A preferred improvement of the invention resides in the fact that the inclination at least of the display module of the head up type is adjustable with respect to an adjustment axis perpendicular to the normal viewing direction.

Such an embodiment of a display device means that it is advantageously possible, through a simple rotation or a simple change in inclination, for the position of the image seen by the user of the display device to be varied.

Another preferred improvement of the invention resides in the fact that the inclination at least of the display module of the head up type is adjustable according to the height of the viewing position of the user of the display device.

Such an embodiment of a display device means that it is advantageously possible for the use of the display device to be rendered more comfortable for users, notably drivers, of different heights.

Another preferred improvement of the invention resides in the fact that the adjustment means is designed such that the inclination of the display module of the head up type and
the inclination of the display module of the head down type
are adjustable with respect to the adjustment axis.

Such an embodiment of a display device means that it is advantageously possible to adjust not only the inclination of the display module of the head up type, but also the inclination of the display module of the head down type; in other words, it is possible to vary the inclination of the two display modules of the display device. According to a preferred embodiment of the present invention, the variation of the inclination of the display module of the head up type can be designed to be independent of the variation of the inclination of the display module of the head down type. According to another preferred embodiment of the present invention, the variation of the inclination of the display module of the head up type is linked to the variation of the inclination of the display module of the head down type.

One particularly preferred improvement of the invention resides in the fact that a variation of the inclination of the display module of the head up type and of the display module of the head down type is designed such that not only the inclination of the display module of the head up type is changed but also the inclination of the display module of the head down type is changed.

Such an embodiment of a display device means that it is advantageously possible to vary the inclination of the display module of the head up type and the inclination of the display module of the head down type.

Another preferred improvement of the invention resides in the fact that, when the inclination of the display module of the head up type and of the display module of the head down type is varied, the change in inclination of the display module of the head up type and the change in inclination of the display module of the head down type are equal.

Such an embodiment of a display device means that it is advantageously possible to vary the inclination of the display module of the head up type and the inclination of the display module of the head down type in parallel.

One particularly preferred improvement of the invention resides in the fact that the display module of the head down type is positioned nearer to a user of the display device, that
the display module of the head up type is positioned further away from the user of the display device,
and that the adjustment axis is designed to be between the display module of the head down type and the display module of the head up type.

Such an embodiment of a display device means that it is advantageously possible to produce the display device with reduced complexity, at a low cost and in a stable manner.

Another preferred improvement of the invention resides in the fact that the display module of the head down type comprises at least one display surface with a mobile needle or with a numerical display element.

One particularly preferred improvement of the invention resides in the fact that the display module of the head down type comprises a first display module of the head down type and a second display module of the head down type.

Other features and advantages of the invention will become apparent upon reading the description that follows of one particular non-limiting embodiment of the present invention.

DRAWINGS

Figure 2:
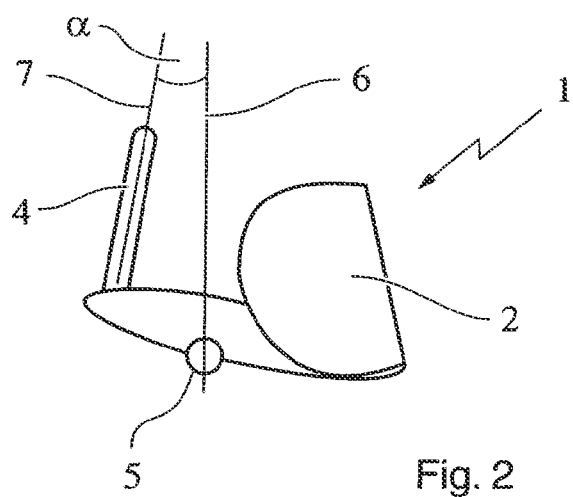
Figure 3:
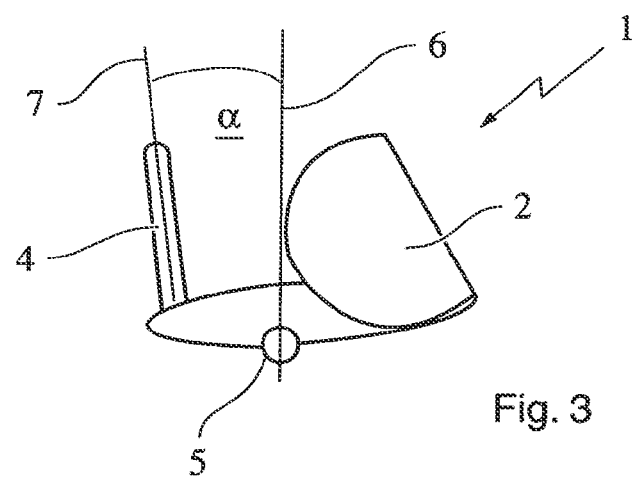

The invention will be better understood thanks to the description hereinafter, which relates to preferred embodiments, presented by way of non-limiting example and explained with reference to the appended schematic drawings, in which:

FIG. 1 is a schematic face view of a display device according to the present invention, FIG. 2 is a schematic side view of a display device according to the present invention positioned in a first position, and FIG. 3 is a schematic side view of a display device according to the present invention positioned in a second position.

DETAILED DESCRIPTION

As shown in FIG. 1, a display device 1 according to the present invention comprises a first display module of the head down type 2, a second display module of the head down type 3, and a display module of the head up type 4. Typically, the display module of the head up type 4 comprises a projection module and a reflection element (not shown in detail). Typically, the reflection element is positioned in a normal viewing direction. The normal viewing direction is the viewing direction of a user of the display device 1, notably a vehicle driver, when he observes, notably through a windshield, the outside situation in front of the vehicle. Typically, the reflection element is designed to reflect at least partially an image coming from the projection module in the normal viewing direction. The reflection element can be a semi-transparent mirror, in other words an optical element allowing the user of the display device 1, notably a vehicle driver, to see not only the outside situation in front of the vehicle through the reflection element but also the image that is generated in the projection module. Such display devices are commonly known as display devices of the head up type (or by the acronym HUD, head up display).

According to the present invention, the display device 1 comprises at least one display module of the head down type 2, 3, notably for displaying with an analog or numerical display information such as—for example—the speed of the vehicle or the number of revolutions of the engine or the fuel gauge. For example, the first display module of the head down type 2 is positioned on the left for displaying the speed of the vehicle and the second display module of the head down type 3 is positioned on the right for displaying the number of revolutions of the engine.

According to the present invention, the position of the display device is—at least partially—adjustable, notably the inclination at least of the display module of the head up type 4 with respect to an adjustment axis 5 perpendicular to the normal viewing direction of the user. This is carried out by an adjustment means allowing the variation of the inclination at least of the display module of the head up type with respect to the adjustment axis 5. Preferably, the variation of the inclination at least of the display module of the head up type 4 can be implemented by the user according to the height of the viewing position of the user, in other words notably depending on the height of the user.

FIG. 2 shows a schematic side view of the display device 1 according to the present invention, the display device 1 being positioned in a first position corresponding notably to a smaller size for the driver of the vehicle. FIG. 3 shows a schematic side view of the display device 1 according to the present invention, the display device 1 being positioned in a second position corresponding notably to a larger size for the driver of the vehicle.

In the example shown of the display device 1, the inclination of the display module of the head up type 4 is effected through a change in the inclination of the whole of the display device 1 with respect to the axis 5. This implies that a change in the inclination of the display module of the head up type 4 and a change in the inclination of the display module of the head down type 2, 3 happen in parallel. It is possible, according to the present invention, for the inclination (or the position) of the display module of the head up type 4 to be changed independently of the inclination (or the position) of the display module of the head down type 2, 3.

The inclination of the display module of the head up type 4 can—for example—be defined by an angle $\alpha$ between the vertical 6 and the plane 7 of the display module of the head up type 4.

In its second position (FIG. 3), the display device 1 is—for example—inclined by 30° with respect to its first position (FIG. 2).

The change in inclination of the display module of the head up type 4 (together with the inclination of the display module of the head down type 2, 3 or independently of the inclination of the display module of the head down type 2, 3) can be effected manually or by means of a motor (or automatically).

The invention claimed is:

1. A display device for a vehicle, comprising:
   a head down display module;
   a head up display module comprising a reflection element configured to at least partially reflect an image from a projection module toward a user and to enable the user to see through the reflection element; and
   an adjustment assembly configured to enable adjustment of a first inclination of the head up display module about an adjustment axis and to enable adjustment of a second inclination of the head down display module about the adjustment axis, wherein the adjustment axis is positioned between the head up display module and the head down display module and is substantially perpendicular to a normal viewing direction of the user.

2. The display device as claimed in claim 1, wherein at least the first inclination of the head up display module is adjustable according to a height of a viewing position of the user.

3. The display device as claimed in claim 1, wherein the adjustment assembly is configured to incline the head up display module and the head down display module together such that a first change in the first inclination is substantially equal to a second change in the second inclination.

4. The display device as claimed in claim 1, wherein the adjustment assembly is configured to position the head down display module nearer to the user than the head up display module.

5. The display device as claimed in claim 1, wherein the head down display module comprises at least one display surface with a mobile needle or with a numerical display element.

6. The display device as claimed in claim 1, wherein the head down display module comprises a first head down display module and a second head down display module.

* * * * *